(12) United States Patent
Fontan

(10) Patent No.: US 8,227,727 B2
(45) Date of Patent: Jul. 24, 2012

(54) MEAL TRAY DISPENSING TROLLEY

(75) Inventor: Jean-Paul Fontan, La Celle-Saint-Cloud (FR)

(73) Assignee: Societe de Gestion d'Hotels et Restaurants-Sogeres, Boulogne-Billancourt (FR)

( * ) Notice: Subject to any disclaimer, the term of this patent is extended or adjusted under 35 U.S.C. 154(b) by 1114 days.

(21) Appl. No.: 12/083,216

(22) PCT Filed: Oct. 18, 2006

(86) PCT No.: PCT/FR2006/002341
§ 371 (c)(1),
(2), (4) Date: Apr. 7, 2008

(87) PCT Pub. No.: WO2007/045764
PCT Pub. Date: Apr. 26, 2007

(65) Prior Publication Data
US 2009/0096335 A1 Apr. 16, 2009

(30) Foreign Application Priority Data
Oct. 19, 2005 (FR) .................................... 05 10656

(51) Int. Cl.
*A47J 39/02* (2006.01)
*F25B 29/00* (2006.01)
*A47F 3/04* (2006.01)
(52) U.S. Cl. ....... 219/386; 219/214; 99/483; 222/146.5; 165/58
(58) Field of Classification Search .................... None
See application file for complete search history.

(56) References Cited

U.S. PATENT DOCUMENTS

| | | | | |
|---|---|---|---|---|
| 3,573,430 A | * | 4/1971 | Eisler | 219/385 |
| 4,103,736 A | * | 8/1978 | Colato et al. | 165/48.1 |
| 4,323,110 A | * | 4/1982 | Rubbright et al. | 165/267 |
| 5,028,761 A | * | 7/1991 | Oda et al. | 219/386 |
| 5,086,834 A | * | 2/1992 | Grandi | 165/135 |
| 5,240,320 A | | 8/1993 | Yerman | |
| 5,403,997 A | * | 4/1995 | Wimpee et al. | 219/386 |
| 5,404,935 A | * | 4/1995 | Liebermann | 165/48.1 |
| 5,449,232 A | * | 9/1995 | Westbrooks et al. | 312/410 |
| 5,797,445 A | * | 8/1998 | Westbrooks et al. | 165/11.1 |
| 5,992,411 A | | 11/1999 | Ayot et al. | |
| 6,120,819 A | * | 9/2000 | Violi et al. | 426/243 |
| 6,279,470 B2 | * | 8/2001 | Simeray et al. | 99/470 |
| 6,684,657 B1 | * | 2/2004 | Dougherty | 62/237 |
| 6,802,367 B1 | * | 10/2004 | Westbrooks et al. | 165/201 |

FOREIGN PATENT DOCUMENTS

EP 0 717 946 A1 6/1996
FR 2 796 818 2/2001

* cited by examiner

*Primary Examiner* — Joseph M Pelham
(74) *Attorney, Agent, or Firm* — Oliff & Berridge, PLC

(57) ABSTRACT

The trolley (10) for dispensing meal trays (11) comprises a parallelepipedic enclosure (12) equipped with two doors (15, 16) and two side panels (17, 18), hot plates (35) superposed in the central zone of the enclosure (12), plate supports (39, 40), and first and second slides (43, 44, 45, 46) arranged along the side panels (17, 18). The trolley (10) comprises:
  openings made in the side panels (17, 18) of the enclosure (12) to house add-on elements added from the outside of the side panels (17, 18) and salient inside the side panels (17, 18) by insertion in said openings,
  support means arranged near the open faces (13, 14),
  rigid panels (25, 26, 27) forming the bodywork, fixed onto the support means.

11 Claims, 2 Drawing Sheets

MEAL TRAY DISPENSING TROLLEY

BACKGROUND OF THE INVENTION

The invention relates to a meal tray dispensing trolley enabling two adjacent coplanar trays each having a hot part and a cold part to be positioned on each loading level, said trolley comprising:
- a parallelepipedic enclosure open on two opposite faces each equipped with a door, said faces being connected by two side panels,
- hot plates superposed in the central zone of the enclosure, acting as support for the hot parts of the meal trays,
- plate supports arranged along the side panels of the enclosure,
- first and second slides arranged along the side panels of the enclosure for guiding and securing the cold parts of the trays,
- a bodywork protecting said enclosure.

STATE OF THE ART

Prior art trolleys of this kind are designed for storing and dispensing meal trays with hot and cold dishes on a single tray. They are used in particular in institutions and hospitals for implementing cold conservation distribution operations in which the meals are cooled rapidly as soon as they have been cooked. They are stored in a cold conservation system and can be distributed several days after they have been prepared. They are reheated or more precisely warmed up to consumption temperature just before being distributed to the patients.

This type of trolley is often used, as the heating means of the hot part and the refrigerating means of the cold part of the meal trays are integrated in the trolley. The cumbersome presence of an adjoined and detachable technical module containing these means is therefore avoided.

Nevertheless, existing trolleys are not totally satisfactory. In known manufacturing techniques, the trolley is made in a single part from rotomoulded plastic. It has ribbed double panels filled with cellular foam to make it isothermal. The ribs form cross-braces and the foam, of the same nature as the panels, adheres to the latter in a layer that is sufficiently thick to form bridgings at the crossing points of the ribs. Although the three-dimensional structure given to the panels gives the trolley great resilience and a great impact strength, this type of trolley is very complicated to manufacture and remains costly.

The document FR-A-2796818 describes a trolley of simplified manufacture. This trolley comprises a parallelepipedic enclosure having two side panels and two doors parallel two by two. The side panels are lined with a thermal insulator, in particular polyurethane foam-based. The outside of the panels is made from coloured plastic-coated sheet metal, whereas the inside is made from stainless steel. In certain alternative versions, the slides and hot plate supports are formed directly in the stainless steel layer, which is difficult and expensive to manufacture. In other alternative versions, the slides and hot plate supports are elements that are added-on to the inside of the enclosure on the inside of the side panels, which is delicate and tedious to achieve as the fitter has to kneel down and perform these operations from the outside of the enclosure. In addition, it is the shape, constitution and relative assembly of the panels that give the assembled unit its strength. To reduce the weight of the trolley, the panels are often of small thickness and the strength may sometimes not be sufficient.

OBJECT OF THE INVENTION

The object of the invention is to palliate these shortcomings by proposing a meal tray dispensing trolley of simple and inexpensive design and manufacture, and presenting a good strength.

According to the invention, this object is achieved by the fact that it comprises:
- openings made in the side panels of the enclosure to house add-on elements added from the outside of the side panels and salient inside the side panels by insertion in said openings, said add-on elements constituting the plate supports and the first and second slides,
- support means arranged near to each open face to be salient outside the panels of the enclosure,
- rigid panels forming the bodywork, fixed onto the support means determining a gap with respect to the enclosure to receive a thermal insulator.

It should be understood that manufacture of a trolley according to the invention is facilitated as the elements forming the first and second slides and the plate supports are added on and inserted from the outside in openings provided in the panels of the enclosure, and not from the inside like certain embodiments of the prior art. The enclosure panels are flat, unlike other prior art embodiments.

In a preferred embodiment, the support means are formed by two strengthening frames each framing an open face of the enclosure. The combination of the parallelepipedic enclosure and of the strengthening frames forms a totally rigid structure for which the possibilities of deformation of deformable parallelogram type are eliminated. This structure can be covered by rigid coating panels of any type as these panels contribute for a small part to the strength of the trolley, unlike the prior art where sheet metal had to be used. Insulating panels of small weight, such as acrylic panels for example, are preferred. As the bodywork panels are insulating, the thermal insulator is thereby able to be less expensive and preferably lighter.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
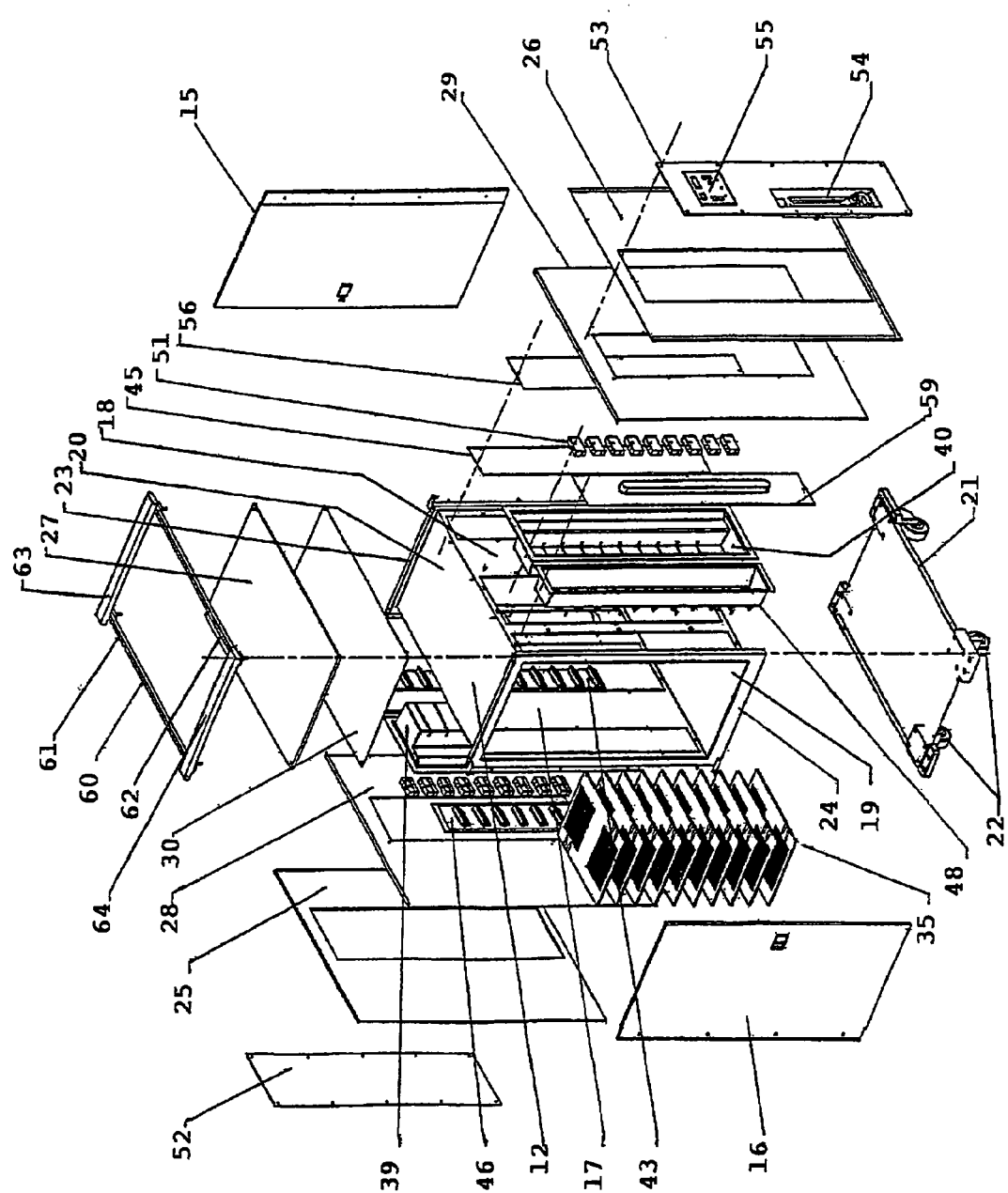
FIG. 1 is an exploded perspective view of a dispensing trolley unit according to the invention.

With reference to the figures, a trolley 10 for dispensing meal trays 11 comprises a parallelepipedic enclosure 12 made of brushed or etched stainless steel. Enclosure 12 is open on two opposite faces 13, 14 each equipped with a door, respectively referenced 15 and 16. The faces 13, 14 are joined by two side panels 17, 18 parallel two by two, and two horizontal panels parallel two by two, one bottom and the other top, respectively referenced 19 and 20. Enclosure 12 is fixed on a support base 21 comprising at the four corners castors 22 mounted rotating on vertical swivel pins and salient rubber stops 31.

Two rectangular strengthening frames 23, 24 each frame an open face 13, 14 and constitute support means of the bodywork. In the embodiment described, each strengthening frame 23, 24 is added on and fixed by any suitable means on the outside of panels 17, 18, 19, 20 of enclosure 12 so as to be salient from said panels. The bodywork of enclosure 12 is formed by two side panels 25, 26 fixed to vertical uprights of strengthening frames 23, 24, and a top panel 27 fixed to the top cross-braces of strengthening frames 23, 24. Due to this arrangement, a gap is present between the enclosure and the bodywork to allow the presence of a thermal insulator. Fixing of panels 25, 26, 27 can be performed by any known means, for example by sticking, bolting or riveting. The cross-section of the uprights and of the cross-braces, here of tubular type, of the strengthening frames is a square, but it may be of any shape without departing from the scope of the invention. For example, the cross-section of the sections forming the uprights and cross-braces of strengthening frames 23, 24 can be shaped so as to present a securing wing parallel to facing panel 17, 18, 20. The outside face of corresponding panel 25, 26, 27 is then fixed onto the inside face of the securing wing.

In other alternative embodiments, not represented, strengthening frames 23, 24 are directly constituted by enclosure 12 itself. When enclosure 12 is manufactured, panels 17, 18, 19, 20 are first folded at their ends to form salient edges. Panels 17, 18, 19, 20 are then assembled to one another, for example by welding, so that the set of edges arranged around each open face 13, 14 forms a strengthening frame 23, 24. The folded edges can be of any cross-section provided the added-on bodywork is able to be fixed thereon.

Rigid panels 25, 26, 27 are coated with insulating caches respectively referenced 28, 29, 30, for example made of polyurethane foam, constituting the thermal insulation. Panels 25, 26, 27 are advantageously made of acrylic, which is a light, insulating, rigid, and potentially transparent and/or coloured material. Insulating caches 28, 29, 30 can therefore be made from a medium-quality material, as a part of the insulation is performed by panels 25, 26, 27. Insulating caches 28, 29, 30 can be of any nature, rigid or flexible, stuck or not onto the bottom faces of panels 25, 26, 27. In the example described, insulating caches 28, 29, 30 are rigid and fit between panels 25, 26, 27 and the outside faces of the uprights and of the top cross-brace of strengthening frames 23, 24. In other alternative embodiments, insulating caches 28, 29, 30 are housed between strengthening frames 23, 24 in the above-mentioned gap provided for this purpose.

Each door 15, 16 comprises a transparent acrylic panel, strengthened on one side by a section 32, 33 fitted pivoting on hinges 34 provided on corresponding strengthening frame 23, 24. Nevertheless, panels 25, 26, 27 and doors 15, 16 can be made of any material, for example transparent or translucent polycarbonate. Doors 15, 16 advantageously fold back against side panels 25, 26 in the open position for distribution of meal trays 11 to the patients. A blocking system (not represented) in the open position can be integrated in doors 15, 16 and in side panels 25, 26.

The two doors 15, 16 give access to the inside of enclosure 12 for two series of superposed meal trays 11 to be able to be loaded. Each rectangular-shaped meal tray 11 is subdivided into a cold part 11a reserved for the starter and the dessert, and a hot part 11b for the main course. Hot part 11b is placed in enclosure 12 first so that cold part 11a is always situated on the side where the corresponding door 15, 16 is located.

A double hot plate 35 equipped with two heating circuits 36, 37 to receive hot parts 11b of two adjacent coplanar trays 11 is arranged on each loading level. All the hot plates 35 are arranged at regular intervals in superposed horizontal planes in the central zone of enclosure 12 to form a hot zone. A cold zone extending up to the corresponding door 15, 16 is located on each side of central zone.

Hot plates 35 have heating circuits 36, 37 with a screen-printed resistor on a glass plate. Any other electric heating system can naturally be used, in particular halogen tube or electromagnetic induction systems. Meal trays 11 are made of thermoformed plastic, for example transparent or painted polycarbonate, with insertion of a detection magnet 38 located at the periphery of hot part 11b.

Each hot plate 35 is secured at two diagonally opposite corners by two plate supports 39, 40 in the form of hollow vertical columns securely fixed to side panels 17, 18. On each side of the hot zone, the columns delineate two stacks 41, 42 for extraction of the hot air generated during the heating-up phase. The hot air flow is absorbed by an aluminium plate (not represented) housed in the top part of the trolley.

Figure 2:
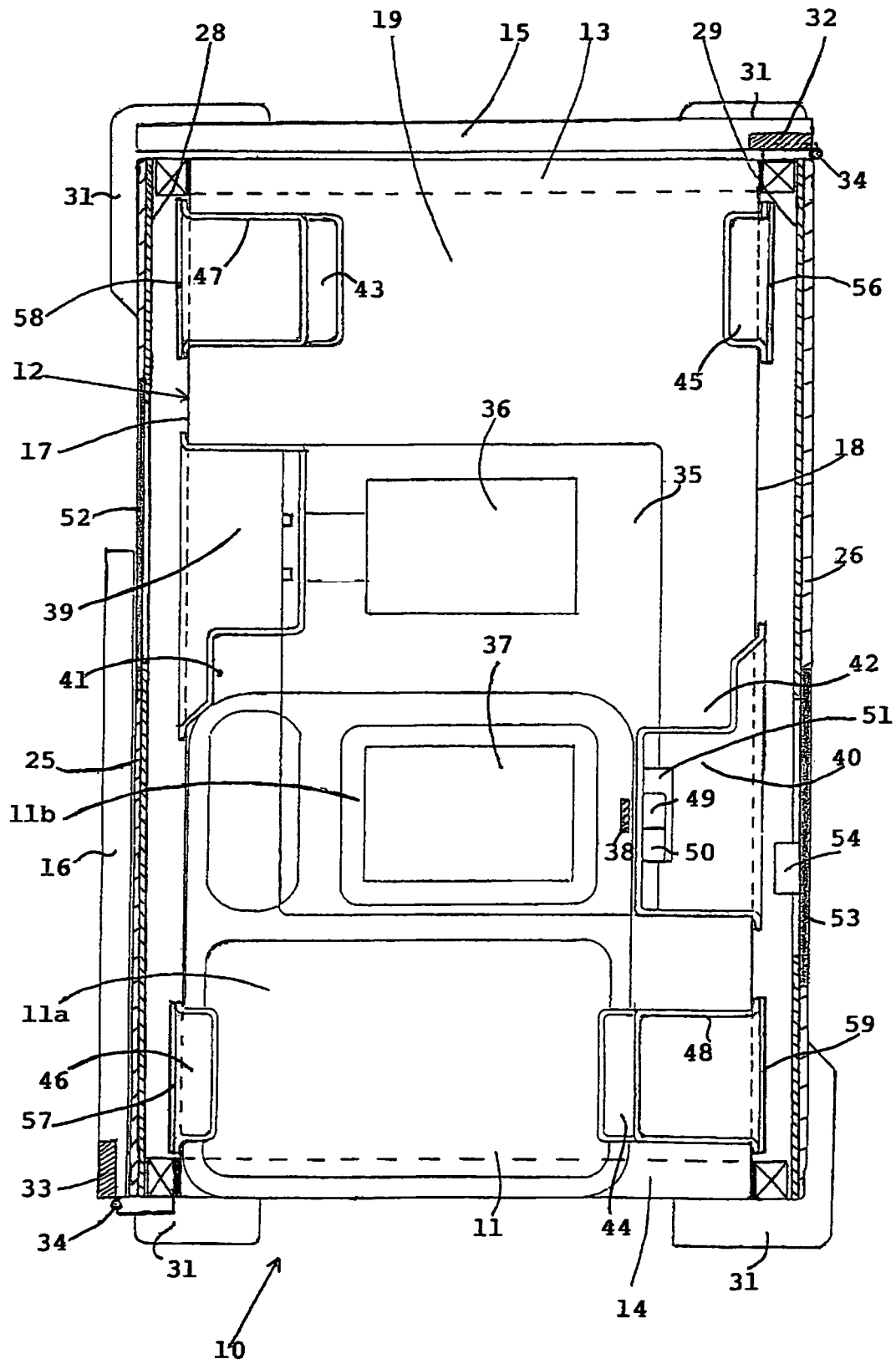
FIG. 2 is a cross-section of the trolley of FIG. 1 in a horizontal cross-sectional plane.

Hot parts 11b of meal trays 11 of one and the same level bear on hot plates 35, whereas guiding and positioning of cold parts 11a of meal trays 11 are performed on each side of side panels 17, 18 by a first slide 43, 44 and a second slide 45, 46. Plate supports 39, 40 and slides 43, 44, 45, 46 of the two sides of enclosure 12 are symmetrical with respect to the centre of the diagonals of any one level. In FIG. 2, cold part 11a of meal tray 11 situated near door 16 is supported on the right by first slide 44 and on the left by second slide 46. A reverse arrangement with respect to the longitudinal axis of trolley 10 is made on the side where opposite door 15 is located, where cold part 11a of meal tray 11 is supported on the right by second slide 45 and on the left by first slide 43.

First slides 43, 44 extend in parallel direction from the inside wall of two vertical trunkings 47, 48, in which frigorie accumulators formed by eutectic plates are integrated.

More precisely, trunkings 47, 48 and first slides 43, 44 are formed by two add-on elements made of thermoformed plastic. Likewise, second slides 45, 46 and the columns forming plate supports 39, 40 are add-on thermoformed plastic elements. After being inserted from the outside, they are housed in openings of complementary shape provided in side panels 17, 18 of enclosure 12. The add-on elements are in the form of a rectangular trough the top edge of the cavity of which comprises a lateral positioning flange on its periphery, designed to be in contact against the outside of corresponding side panel 17, 18, and are fixed by any suitable means such as for example sticking, bolting or riveting. Other materials can nevertheless be used for manufacturing of the add-on elements without departing from the scope of the invention.

Manufacture of a trolley according to the invention is made easier as the add-on elements form first and second slides 43, 44, 45, 46 and support plates 39, 40 are added on and inserted from the outside in openings provided in panels 17, 18 of enclosure 12, and not from the inside as in certain prior art embodiments. Panels 17, 18 of enclosure 12 are flat, unlike the other prior art embodiments.

Plate supports 39, 40 comprise a plug-in electric connector 49 at each level for power supply of the heating circuits 36, 37, and a presence detector 50 of trays 11 designed to operate in conjunction with magnet 38. Connector 49 and detector 50 are placed on one and the same support referenced 51. Power supply of heating circuits 36, 37 is controlled by detectors 50. In certain alternative embodiments, each detector 50 is connected to a light-emitting diode visible from outside, for example through doors 15, 16 and/or side panels 25, 26, to indicate the state of loading of trolley 10 to the operator dispensing trays 11 without having to open doors 15, 16.

Each side panel 25, 26 comprises an access hatch blocked off by a removable plate 52, 53 made from the same material as panels 25, 26 to allow access to supports 51 from the outside of trolley 10. A low-voltage socket 54 for electrical connection of trolley 10 is provided in removable plate 53, as is a control panel 55 extending flush with side panel 26, i.e. without any outward protrusion therefrom.

The add-on elements forming second slides 45, 46 and trunkings 47, 48 are in the form of a rectangular trough whose cavity is blanked off outside enclosure 12 by blanking plates 56, 57 and respectively 58, 59, held pressing against the flange of said elements by any suitable means. Having recourse to add-on elements on side panels 17, 18 makes manufacture of enclosure 12 easier and lowers the production cost. These elements of complex shape are achieved easily due to the use of thermoformed plastic material, for example transparent or translucent polycarbonate (for example by moulding).

In certain alternative embodiments, first and second slides 43, 44, 45, 46 comprise a lighting system (not represented) integrated in the add-on elements and visible from the outside by transparency of the plastic material of said elements and of the material forming doors 15, 16.

Trolley 10 advantageously comprises a rack 60 which has at least two longitudinal sections 61, 62 fixed to the top panel 27 by any suitable means. Two transverse sections 63, 64 of oblong cross-section are fitted on said longitudinal sections 61, 62 for ease of handling. Longitudinal sections 61, 62 can be higher than top panel 27 so that the products can flow easily when cleaning trolley 10. Rack 60 is designed to facilitate handling of the trolley and to protect top panel 27 which is often subjected to external impacts. In certain alternative embodiments, each transverse section 61, 62 is salient with respect to the vertical surface of door 15, 16 to increase protection of the bodywork and doors 15, 16.

The invention claimed is:

1. A meal tray dispensing trolley enabling two adjacent coplanar trays each having a hot part configured to reheat food and a cold part configured to cool food, each part being positioned on each loading level, said trolley comprising:
    a parallelepipedic enclosure having two open faces opposing one another each open face being equipped with a door, said faces being connected by two side panels,
    hot plates superposed in a central zone of the enclosure, acting as support for the hot parts of the meal trays,
    plate supports arranged along the side panels of the enclosure,
    first and second slides arranged along the side panels of the enclosure for guiding and securing the cold parts of the trays,
    a bodywork protecting said enclosure, wherein the bodywork comprises:
    openings made in the side panels of the enclosure to house add-on elements added from the outside of the side panels and protruding inside the side panels by insertion in said openings, said add-on elements constituting the plate supports and the first and second slides,
    support means arranged adjacent to each open face to be protruding outside the panels of the enclosure, and
    rigid panels forming the bodywork, fixed onto the support means determining a gap with respect to the enclosure to receive a thermal insulator.

2. The trolley according to claim 1, wherein the add-on elements are made of thermoformed plastic.

3. The trolley according to claim 1, wherein the support means are formed by two strengthening frames each framing an open face.

4. The trolley according to claim 1, further comprising a rack comprising at least two longitudinal sections, positioned with respect to the side panels, the longitudinal sections being fixed onto a top panel of the bodywork, whereon two profiles transverse sections positioned with respect to the longitudinal sections are fitted.

5. The trolley according to claim 4, wherein each transverse section of the rack protrudes further out from the trolley than a vertical surface of the door situated closest to each transverse section when the door is in a closed position.

6. The trolley according to claim 1, wherein the add-on elements have a periphery comprising a lateral flange for positioning against the outside of the corresponding side panel of the enclosure.

7. The trolley according to claim 1, wherein the bodywork panels are made from acrylic.

8. The trolley according to claim 1, wherein each door comprises an acrylic panel strengthened on one side by a section mounted pivoting on hinges provided on a corresponding strengthening frame.

9. The trolley according to claim 1, wherein the slides comprise a lighting system.

10. The trolley according to claim 1, wherein each plate support comprises an electric connector for power supply of the corresponding hot plate, said power supply being controlled by a presence detector of meal trays.

11. The trolley according to claim 10, wherein the meal tray presence detector is connected to a light-emitting diode visible from outside of said trolley.

* * * * *